UNITED STATES PATENT OFFICE.

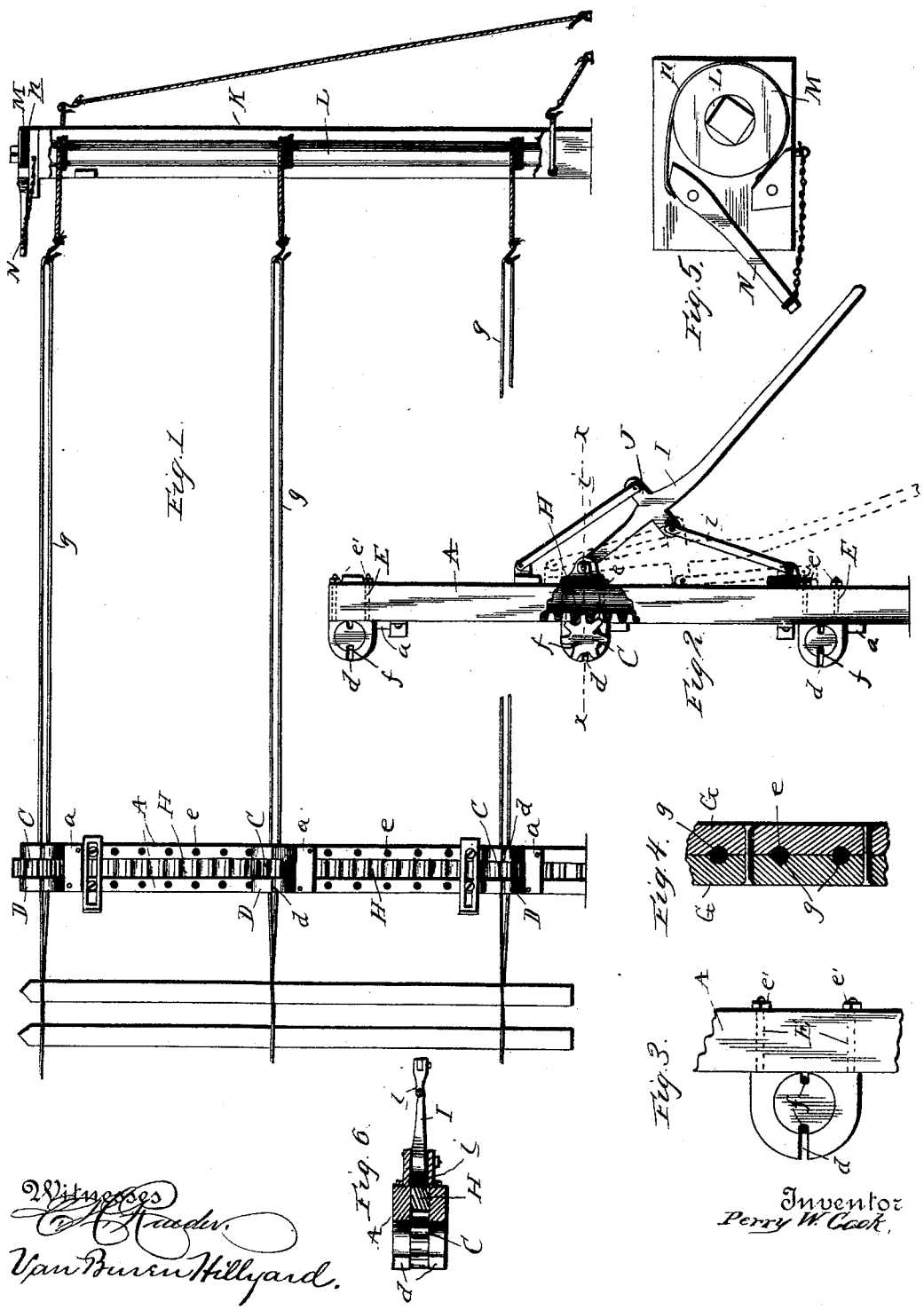

PERRY W. COOK, OF BALTIMORE, OHIO.

WIRE-FENCE MACHINE.

SPECIFICATION forming part of Letters Patent No. 415,240, dated November 19, 1889.

Application filed August 3, 1889. Serial No. 319,605. (No model.)

*To all whom it may concern:*

Be it known that I, PERRY W. COOK, a citizen of the United States, residing at Baltimore, in the county of Fairfield and State of Ohio, have invented certain new and useful Improvements in Wire-Fence Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to wire-fence machines, and aims to simplify and lighten and reduce the cost of construction of this class of machines as compared with similar prior machines, and to increase its scope, whereby it can be readily adjusted to high or low fences or to two or more cables, which can be adjusted to any distance from the ground and from each other. A lever is connected by links with the rack-bar, so that it can lock and prevent the wires untwisting when the picket has been inserted between the strands and the lever operated to twist the said strands about the picket.

The improvement consists in the novel construction and combination of the parts, which will be hereinafter more fully described and claimed, and which are shown in the accompanying drawings, in which—

Figure 1 is a front view showing the application of my invention. Fig. 2 is a side view, parts being broken away, of a machine showing my invention; Fig. 3, a side view of the twisting-wheel bearing; Fig. 4, a detail view of a modified form of frame-bar; Fig. 5, a top plan view of the tension device. Fig. 6 is a cross-section of the machine on the line X X of Fig. 2.

The frame of the machine is composed of two frame-bars A, which are held together by similar cross-bars *a*, placed at proper intervals and fastened to the bars A. The twisting-wheels C (there may be any required number) are mounted in bearings D, which are adjustable on the frame. Each bearing D is provided with a pair of shanks E, which are threaded on their outer end and adapted to pass through a corresponding pair of openings of the series of openings *e* in the frame-bars A. The bearings are held to place by nuts *e'* on the ends of the shanks E.

The twisting-wheels C have diametrically-opposite slots *f* to receive the fence-wires *g*. The slot *d* in the edge of the bearings admits the fence-wires *g* into the slots *f* in the twisting-wheels in the ordinary manner.

The openings *e* may be bored or cast in the frame-bars; but the most economical way of constructing the frame-bars is that shown in Fig. 4, which shows them composed of two strips G G, each cast or rolled with depressions *g* at regular intervals, that are placed together with the depressions in each strip opposite each other, thereby forming the openings *e* for the reception of the shanks E. The strips are bolted or otherwise secured together.

The rack-bar H is held between the frame-bars A and the cross-bars *a*, and has teeth on its front side which mesh with the toothed twisting-wheels and is operated by the lever I, which is pivoted at its inner end to the frame, and is connected by links *i* with the said rack-bar. The lever has a cross-bar J, which projects an equal distance on each side of the lever, and to which the links *i* are attached. The cross-bar J is placed at some distance from the inner end of the lever, to obtain the required length of movement for the said rack-bar to secure the requisite number of twists between the pickets. When the lever reaches the limit of its movement in either direction up or down, the pivots of the lever and the link that happens to be nearer the frame will be about in the same straight line, thereby forming a lock-joint, which will prevent the lever from flying back while the picket is being placed in position to be twisted in.

The tension device is composed of frame K, windlass L, journaled at its ends in the frame, brake-wheel M on the end of windlass L, brake-band *n*, and brake-lever N. The fence-wires are connected with the windlass L, and when adjusted to the proper tension by turning the windlass are held by applying the brake-band *n* to the brake-wheel M.

Having thus described my invention, what I claim, and desire to secure by Letters Patent, is—

1. In a fence-machine, the combination, with the frame, the twisting-wheels, and the rack-bar meshing with the twisting-wheels, of the operating-lever pivoted to the frame, and the links on opposite sides of the lever pivotally connected therewith and with the said rack-bar, whereby, when the lever reaches the limit of its movement in either direction, the pivots of the lever and the link that happens to be nearer the frame will be about in the same straight line, thereby forming a lock-joint, substantially as and for the purpose described.

2. In a fence-machine, the combination, with the frame having its frame-bars composed of two strips, each strip having a series of depressions, the two strips being fastened together so that the depressions come opposite each other and form a series of openings, of the twisting-wheel bearings having shanks adjustable on the frame, and the twisting-wheels and means for operating them, substantially as set forth.

3. In a fence-machine, the combination, with the frame and the windlass journaled at its ends in the said frame, of the brake-wheel M, the band n, embracing the wheel M, and the brake-lever pivoted to the frame near one end and having the said band n attached to the shorter end of the lever, substantially as described.

4. The hereinbefore-described fence-machine, comprising the frame-bars A, having a series of openings, the cross-bars a for securing the bars A together, the twisting-wheels, the bearings for the twisting-wheels having shanks and adjustable on the frame, the rack-bar, the lever, and the links connecting the lever with the rack-bar, the parts being constructed, arranged, and operating substantially as and for the purpose described.

In testimony whereof I affix my signature in presence of two witnesses.

PERRY W. COOK.

Witnesses:
C. E. BURTON,
E. O. WEIST.